June 18, 1957 — J. E. EPPICH — 2,795,841

METHOD OF MANUFACTURING COMMUTATORS

Filed Oct. 27, 1952 — 2 Sheets-Sheet 1

INVENTOR.
JOHN E. EPPICH
BY

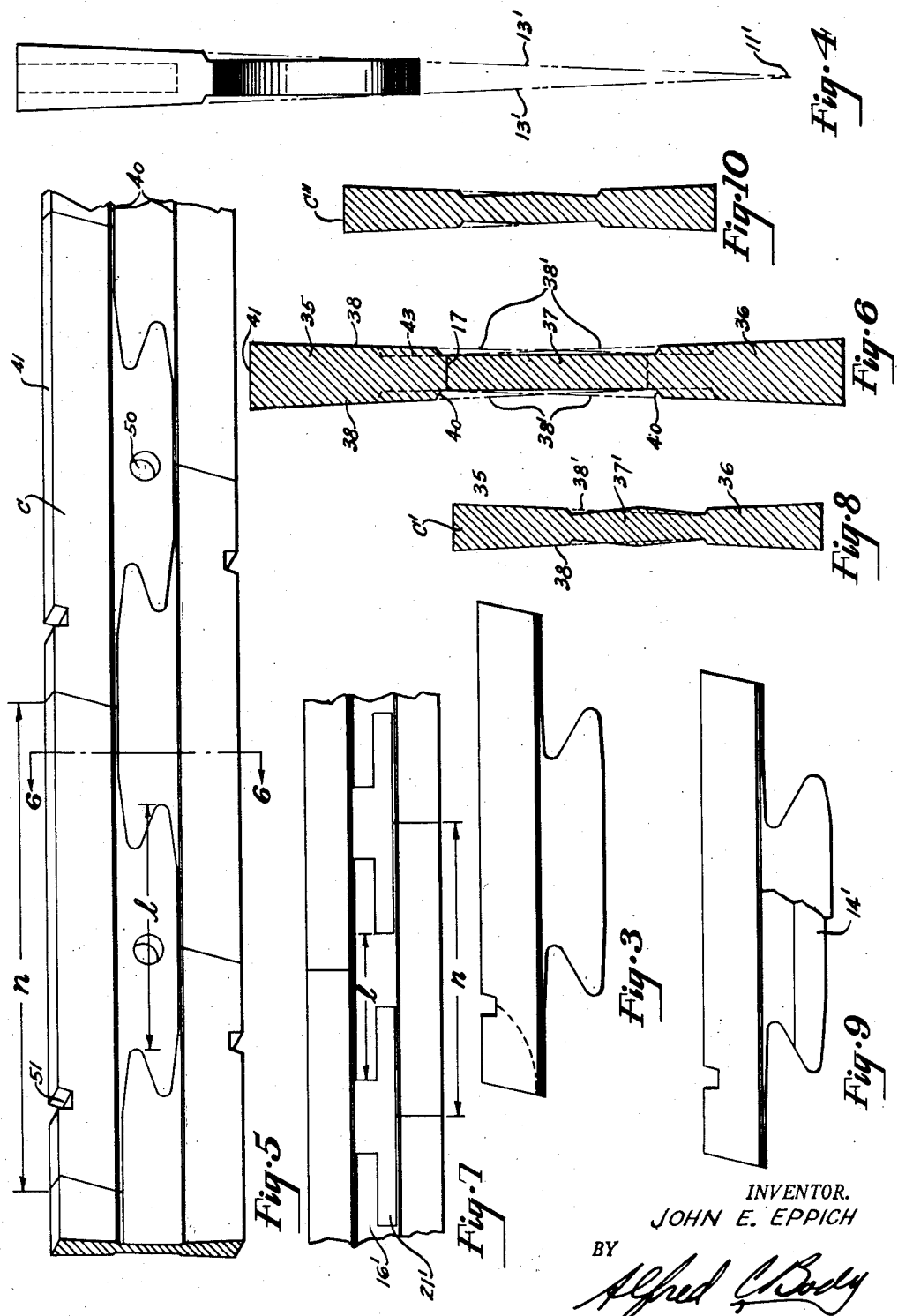

2,795,841
METHOD OF MANUFACTURING COMMUTATORS

John E. Eppich, Cleveland Heights, Ohio, assignor to The Lincoln Electric Company, Cleveland, Ohio, a corporation of Ohio Application October 27, 1952, Serial No. 317,108

2 Claims. (Cl. 29—155.54)

This invention pertains to the art of commutators for electric motors and generators and, more particularly, to a commutator construction, the commutator segment configuration, the bar stock from which they are made and the method of manufacturing same.

The invention is particularly adaptable to the manufacture of commutators used in high-capacity, direct-current generators such as are used for supplying the energy for arc welding and will be particularly described with reference to such generators, although it will be appreciated that the invention is equally applicable to generators and motors for other uses.

Commutators for electric generators are normally made up from a circular stack of copper segments, wedge shaped in cross section with a layer of insulating material therebetween, each segment having a notch on each end thereof forming a circular groove when assembled on each end of the stack into which a retaining ring fits to maintain the stack in rigid, assembled relationship.

Such segments also normally include a tang member extending radially outwardly from one end of the assembled commutator which are slotted to receive the armature wires.

The segments from which the commutator is made are normally stamped or sheared to the final desired shape with the notch from a long, wedge-shaped bar of drawn copper material.

One difficulty which has always attended the manufacture of such commutator segments has been the production of relatively large amounts of scrap material due to the irregular shape of the segments, particularly, the notches and the tang. Various efforts have been made in the past to eliminate the production of this scrap. So far as I know, such efforts have been unsuccessful, even though a subsequent forming operation is performed on the cut segment such as a swaging operation to form the tang. Because of the expense of the copper material and its critical supply, the production of this scrap is a serious problem in manufacturing operations.

Another serious problem which has existed in the manufacture of commutators has been the slotting of the commutator segments so as to provide a suitable space to receive the armature wires so that they can be properly soldered or otherwise electrically connected to the commutator segment. These slots normally cannot be formed before the final assembly of the commutator segments because of the various heat-treating operations which must be performed on the assembled commutator. These heat-treating operations would corrode and provide an oxide film on the sides of the slot which would interfere with the soldering or other operations to provide a good electrical contact between the segments and the armature wire.

These slots must be accurately located in each commutator segment and, heretofore, such slotting operations have been performed by indexing the commutator by hand in a slotting machine. Mechanical indexing has been extremely difficult because a completed commutator normally does not have suitable reference points from which mechanical indexing may be gauged. A single reference point at one point on the periphery of the commutator is unsatisfactory due to inherent variations in thicknesses of the insulating and copper segments around the assembled commutator sufficient to cause serious errors in the indexing and improperly located slots.

The present invention contemplates a shape of copper bar from which the segments will be cut or punched, a segment configuration and an assembled commutator, together with a method of manufacture which overcomes all of the above difficulties and enables the production of a commutator for electric motors or generators without the production of any scrap or a basic manimum of scrap and which does not require swaging or forming operations after the segments have been cut from the bar.

Further, the invention contemplates a segment configuration in conjunction with the insulating medium configuration between the segments and a method of manufacture whereby machine indexing of the assembled commutator may be employed to cut the slots to receive the armature wires.

In accordance with the invention, the individual commutator segments are comprised of two relatively distinct portions, an outer portion adapted to form the outer periphery of the assembled commutator and an inner portion having a longitudinally extending notch in each end forming a nose on the side of the inner portion remote from the outer portion, whereby to form a continuous groove in the ends of the assembled commutator stack. The nose and notch each are identically shaped and dimensioned in plan view. The segments are cut from alternate edges of an elongated, generally flat copper bar stock with the outer portions of the segments being cut from the edges of the bar stock and the inner portions being cut from the center portions of the strip in transverse overlapping relationship, with the nose of one inner portion overlapping longitudinally the nose of the adjacent inner portion so that the nose of one inner portion from one side of the stock forms the notch in the other adjacent inner portion.

If the length of each inner portion measured from the base of the notch to the end of the opposite nose is exactly one half the length of the outer portion, then the segments can be formed wtihout the production of any unused scrap being left over after the segments are cut from hte bar stock (except for the ends of the stock). If such exact ratio is inacceptable to the final commutator design, then some scrap may be the result, depending on the variation from the above-stated ratio, all within the scope of the invention.

The outer edge of each segment is straight and parallel to the axis of rotation; i. e., there is no tang, and, after assembly of the commutator stack, one end of each segment is slotted to receive the armature wires.

The bar stock from which these segments are cut, stamped or otherwise formed, in accordance with the invention, has a shape such that no further mechanical operations to change the cross-sectional shape of the segments after they have been cut will be necessary and generally includes two spaced, longitudinally-extending parallel side sections forming the edges of the bar integrally joined by a central web section. The side sections of the bar stock have sides angulraly disposed relative to and tapering toward each other in the direction of the other side section. The angle of taper is such that the commutator segments with the insulation therebetween, when assembled into a final commutator stack, will provied a solid ring of alternate copper and insulating material.

The segments are cut, stamped or otherwise formed alternately from opposite sides of this bar stock with the side section of the stock forming the outer portion of each segment and the full width of the web section forming the inner portion of the commutator segment. The thickness of the central web section of the bar stock is so adjusted and proportioned that the inner portion of each segment will be entirely contained within the extended planes of the angularly disposed sides of the outer portion. The thickness of the inner portion of the completed segment may be less than or equal to the space between the extended planes but never greater, if no further operations to change the cross-sectional shape of the segment are necessary. Obviously, if such further mechanical operation is to be performed, then the thickness of the inner portion may be made greater than that stated.

Further, in accordance with the invention, wedge-shaped commutator segments may have a transverse notch formed in their outer edge adjacent one end such that when the segments are assembled with sheet-like insulation thereby, correspondingly shaped to the commutator segments but without the notch formed therein, the insulation will extend across the notch whereby an indexing point is available for each commutator segment adjacent to each commutator segment to enable accurate machine indexing and machine sawing of the slots in the segments for the armature wires.

The invention has for one of its objects the provision of a new and improved bar shape from which commutator segments may be cut or formed of such a cross-sectional configuration that the segments may be formed from the bars without the production of any scrap from the forming operation.

Another object of the invention is the provision of a segment configuration which may be cut from generally flat but preferably suitably shaped copper bar stock without the production of any scrap or other waste of material.

Another object of the invention is the provision of a new and improved bar shape from which commutator segments may be cut or stamped, including a center, longitudinally-extending web section having a maximum thickness and width such that it may be at least entirely contained between radially divergent planes passing through the axis of rotation of the commutator and the radially, outermost surfaces of the segments when the segments have been cut from the bar and assembled into the final commutator.

The invention may be comprised in certain parts and arrangement of parts and methods of making same, a preferred embodiment of which will be described in this specification and illustrated in the accompanying drawing which is a part hereof, and wherein:

Figure 3 is a side elevational view of a commutator segment used in the assembly of Figure 1;

Figure 4 is an end elevational view of the commutator segment of Figure 3 showing the angular and thickness relationships of the segment;

Figure 5 is a cross-sectional perspective view of a bar stock embodying the present invention from which the segments of Figure 3 can be cut or formed, the outline of the segments being shown in light lines;

Figure 6 is a cross-sectional view of Figure 5 taken approximately on the line 6—6 thereof;

Figure 7 is a view similar to Figure 5 but showing an alternative shape of commutator segment embodying the present invention;

Figure 8 is a view similar to Figure 6, but to somewhat smaller scale, of an alternative form of bar stock;

Figure 9 is a side elevational view of a commutator segment as cut from the bar stock having a cross section shown in Figure 8, the right-hand side of the view showing the shape of the segment after a final forming operation; and Figure 10 is a cross-sectional view of a copper bar stock showing a still further alternative embodiment of the invention.

Figure 1:
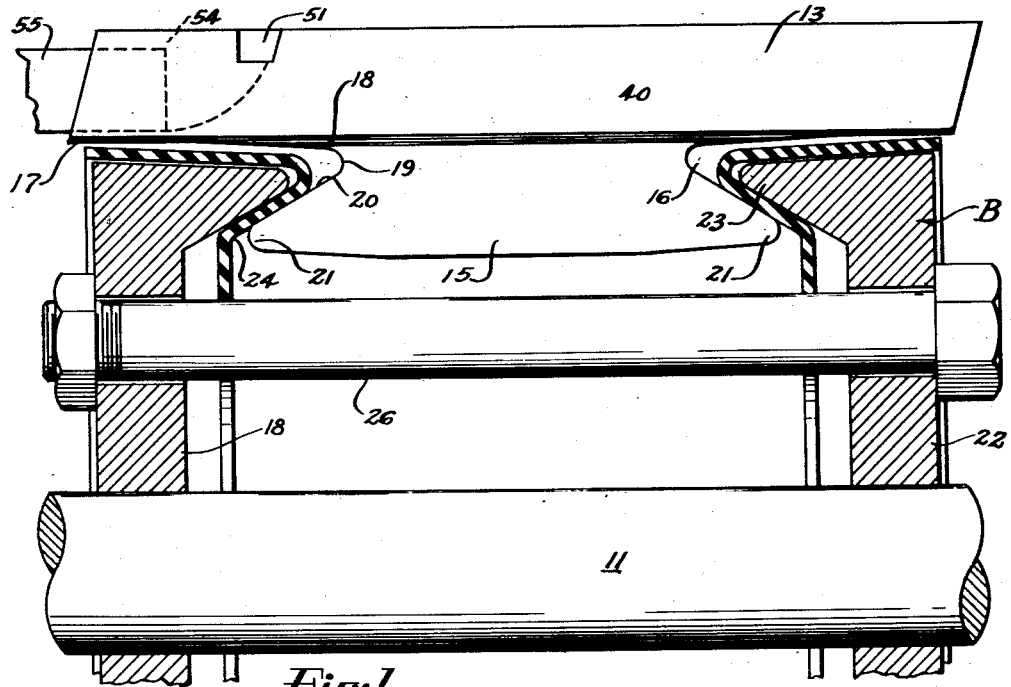
Figure 1 is a fragmentary side sectional view of a commutator constructed in accordance with the present invention.
Figure 2:
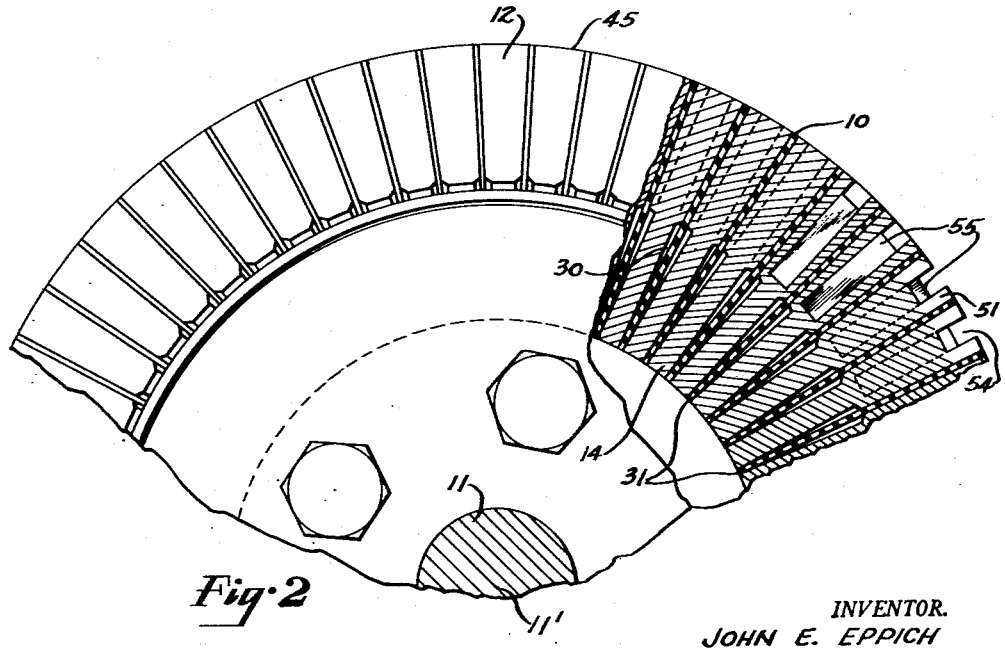
Figure 2 is an end elevational view partly in section of Figure 1.

Referring now to the drawings wherein the showings are for the purposes of illustration only and not for the purposes of limiting the invention, Figures 1 and 2 show an assembled commutator comprised of a plurality of segments A arranged in a circular stack with an insulating segment 10 between each segment A, all supported in a compact, rigid assembly by a retaining ring assembly B on a rotatable shaft 11, only portions of which are shown but which forms the rotor shaft of the motor or generator (not shown).

Each segment A is comprised of a generally elongated outer portion 12 having side walls 13 tapering toward each other in a radially inward direction and an integral inner portion 14 substantially thinner in a circumferential direction than the thickness of the outer portion 12 and having generally parallel side walls 15. The ends of the inner portion of each segment have a generally V-shaped notch 16 forming in the assembled stack of segments a continuous peripheral groove. The notch 16 in each segment is defined by an outer surface 17 generally parallel to the axis of rotation and coincident with the plane of the juncture of the inner and outer portions, but which surface angles slightly towards the axis, as at 18, adjacent the base 19 of the notch. The notch is defined also by an inner surface 20 on a longitudinally-extending, wedge-shaped nose 21. This surface 20 extends at a substantial angle relative to the axis of rotation and forms a wedging surface, as will appear, to enable the commutator segments, together with the insulating segments 10 therebetween which have a similar shape to that of the segments A, to be drawn tightly into assembled relationship. In accordance with the invention, the nose 21 has a shape identical to the notch 16.

The shape of the nose and notch may be varied considerably from that shown, the principal requirement being that the nose 21 and the notch 16 be identically shaped.

The retainer ring assembly B comprises generally a pair of spaced retainer plates 22 in the shape of circular disks which are mounted on the shaft 11 for rotation therewith either by a key or a force fit or otherwise. Each of the plates 22 have an axially-extending, circumferentially-continuous, V-shaped shoulder 23 at the outer periphery, which shoulder 23 is correspondingly shaped to the shape of the notch 16 and extends thereinto for the purpose of locking the segments in assembled relationship. A shell 24 of insulating material molded to correspond to the shape of the notch 16 and the shoulder 23 is positioned in the notch between the shoulder 23 and the segments. The plates may be drawn together in any suitable way so as to force the shoulder 23 into the notch 16; but, in the embodiment shown, a plurality of bolts 26 extending through aligned openings in the plates 22 are employed for this purpose. These bolts 26, when tightened, force the shoulder 23 into the notch 16, forcefully drawing the segments A with the insulation 10 therebetween into firm, rigid, assembled relationship.

The angle of taper between the sides 13 of the outer portion 12 of the segments A is carefully proportioned so that the surfaces 13, when the segments are drawn into final assembled relationship, will have a firm, even pressure therebetween, that is to say, the extended planes 13' of each surface 13 will substantially pass through the axis 11' of rotation of the shaft 11. Naturally, the angle of taper will vary between various commutators for a number of different reasons, such as the commutators containing a different number of segments or because of various thicknesses of the insulating segments 10 or otherwise.

As stated heretofore, the inner portion 14 of the segments A have a circumferential thickness substantially less than the circumferential thickness of the outer portion 12 and the side walls 15 thereof are generally flat and parallel. As will be seen from Figure 2, this arrangement leaves small, axially-extending spaces 30 between the surfaces 15 and the adjacent surfaces of the insulation 10 which do no harm in the final commutator and can be filled with an impregnating material if desired. Preferably, the circumferential thickness of the portions 14 is so adjusted that their innermost corners 31 will lie on the extended plane of the surfaces 13 passing through the axis of rotation of the shaft 11. Such a proportioning of the dimensions results in a commutator of maximum rigidity because these corners will generally abut against the sides of the insulating segments 10, the same as the surfaces 13. It will be appreciated, however, that the thickness of the inner portion 14 could be less than that shown so that the corners 31 lie inside of the extended planes of the surfaces 13. However, in accordance with the invention, the corners 31 must never lie outside of these extended planes, that is to say, the thickness of the inner portion 14 should be so adjusted that all parts of it lie within a plane extending through the axis of rotation and the surfaces 13 of the segments.

Commutator segments are normally cut or sheared from long lengths of drawn or rolled copper bar stock which, because of the method of manufacture, must have a uniform cross section throughout its length. As heretofore stated, because of the irregular shape of the commutator segment, it has heretofore been impossible insofar as I know to manufacture commutator segments from such a length of copper bar stock without the production of a considerable amount of copper scrap left over after the shearing operations.

The commutator segments shown in Figures 1 and 3 are peculiarly adapted to be cut, stamped or formed from a special shape of rolled or drawn copper bar stock having a uniform cross section throughout its entire length.

Thus, in the embodiment shown, a bar stock C is provided comprised of three generally distinct but integral cross-sectional shapes including a pair of spaced edge sections 35 integrally joined by an intermediate web section 37 having a thickness somewhat less than the thickness of the edge sections 35. The edge sections 35 generally have a trapezoidal cross-sectional shape with side surfaces 38 angled relative to each other so that each edge section tapers towards the other edge section; i. e., towards the intermediate web section 37. The web section 37 may be said to have a rectangular cross-sectional shape with uniformly spaced parallel side walls 39. As stated, the thickness of the web section is less than that of the outer sections and the side walls of these sections intersect in shoulders 40 which may be perpendicular to the thickness of the stock C or angled slightly as shown.

Each edge section is adapted to be cut into a plurality of lengths to form the outer portion 12 of the segments A and, therefore, the angle of taper of the sides should correspond with the desired angle of taper of the sides 13 of the segments. In a like manner, the width of the edge sections should at least be equal to the width of the outer portions of the segment A or, preferably, somewhat greater so that after the commutator is assembled, normal machining operations can be carried on to form the rubbing surface for the commutator.

The edge sections 35 are shown as having flat outer surfaces 41, but these surfaces may be curved to correspond to the curvature of the outer surface of the assembled commutator if desired, resulting in less machining away of metal during the final machining operations on the assembled commutator to form the smooth rubbing surfaces for the brushes.

The web section 37 is adapted to form the inner portion 14 of the segments A and, therefore, the thickness of the web section should be that desired for the inner portion 14 which, as above described, should be such that the web section 37 will be entirely contained within the extended planes 38' of the sides 38. The inner portions 14 which are cut from the web section 37 are associated alternately with opposite edge sections of the bar stock C. Each inner portion has a width generally equal to the width of the web section and adjacent inner portions, therefore, overlap transversely of the width of the bar stock generally as shown in Figure 5.

As previously stated, the notches 16 and noses 21 are identically shaped so that the metal removed from one inner portion to form its notch remains with the adjacent inner portion to form its nose 21.

The longitudinal length of each inner portion 14 must be so proportioned in relation to the length of the outer portion such that all the inner portions, regardless of which edge section they remain integral with, will have the same length. Generally, this may be accomplished by making the longitudinal length 1 of each inner portion measured from the base of one notch 16 to the end of the opposite nose 21 of that same portion equal to one half the length n of the outer portion. Generally, the shape of each notch 16 is unimportant so long as the notches 16 and noses 21 are identically shaped. The angles and shapes shown have proven quite satisfactory in practice.

The segments shown may be produced continuously from a length of bar stock without the production of any scrap material, with the exception of such scrap material as may necessarily be produced at both ends of the bar stock C. This may be reduced to a minimum by controlling carefully the length of the bar stock and buying only in multiples of the lengths of the finished segments. The relationship of the individual segments to the bar stock C is clearly shown in Figure 5.

In accordance with the preferred embodiment of the invention, bar stock C, as shown, is progressively moved longitudinally through a power-operated shear press and the segments are consecutively cut from one edge only of the bar stock C. For this purpose, to insure accurate spacing of the segments so that the web section which remains after the shearing operation is of the proper dimension, the shear press, at the same time as it is shearing a segment, simultaneously pierces a guide opening 50 in the next segment to be cut, which opening 50 serves to accurately locate this next segment when it is to be sheared. After the segments have been cut from one side of the bar stock C, it is simply necessary to shear or cut the remaining opposite edge section midway between the inner portions which remain.

In the shearing operation just referred to, it is also possible to simultaneously cut the notches 51, the purpose of which will hereinafter appear.

The insulating segments 10 preferably have the same shape in plan view as the segments A and in a manner described with reference to the cutting of the segments, the insulating segments 10 can be cut from flat strips of insulating material without the production of any scrap material, except at the ends of the strips. For reasons that will appear hereinafter, however, it is preferred that no notches corresponding to the notch 51 of the segments be formed in the insulating segment to be positioned between the commutator segments.

As shown more clearly in Figures 1 and 3, the upper surface 17, 18 defining the notch 16 generally approximately coincides with the intersection of the edge section 35 and the web section 37; i. e., the shoulder 40, and, with this construction, it is possible to obtain the maximum amount of copper in each segment without producing any scrap except at the ends of the bar stock.

Obviously, if it is desired to sacrifice a certain amount of the copper in the final assembled commutator employing the present invention, it is possible to remove portions of the edge sections 35 as shown by the dotted lines 43 in Figure 6; in which case, the portion above the surface 17, as indicated in Figure 6, would still be considered as the outer portion of the commutator segment A.

The primary limitation on the width and thickness of the inner portion 14 is that at all times the metal forming the inner portions 14 must remain within the confines of the extended planes 13' of the surfaces 13 extending approximately through the axis of rotation of the shaft 11. It is possible, of course, to design the commutator so that the planes 13', even though angled relative to each other, do not pass through the axis of rotation such as by making one side of the bar stock flat and increasing the angle of taper of the opposite side relative to the parallel surfaces of the web section. The limitation of the thickness of the inner portion relative to the extended planes would still hold, however.

It will be noted that the commutator segments A, as shown in Figure 1, do not have a tang as such extending radially outwardly beyond the contacting surfaces 41 of the segments. Instead, the outer surface of the commutator is completely cylindrical and commutator wires or bus bars 55 extend into longitudinal slots 54 formed in the left end of each commutator segment as viewed in Figure 1. These slots 54 must, in the normal process of manufacture, be formed in the commutator segments after the commutator has been completely assembled and has gone through various heat-treating processes for the purpose of impregnating the commutator against moisture and the like. The forming of these slots is normally done by sawing with a circular high-speed saw and becauseo of slight variations in the thickness of the insulating segments 10 and other mechanical variations, mechanical indexing of the commutator during this slotting operation has been extremely difficult, if not impossible. An assembled commutator does not have convenient, if any, reference points from which to do this mechanical indexing. Hand indexing has been the rule.

The present invention, however, contemplates a method of manufacture wherein each insulating section 10 may form a mechanical indexing point for each commutator segment. Thus, in the course of manufacture, each commutator segment is provided with the notch 51 generally adjacent the end of the commutator segment in which the armature slot 54 is to be formed. The insulating segments 10, however, while having substantially the same shape as the commutator segments, do not have a notch therein corresponding to the notch 51 so that when the commutator is finally assembled, the insulating segment 10 extends transversely across the notch 51 to provide an indexing surface immediately adjacent each segment so that the entire commutator assembly may be inserted in a machine for sawing the slots 54, which machine has a member to engage the sides of the insulating segments 10 where it extends across the slot 51 to accurately index each commutator segment relative to the saw for sawing the armature slot 54. By such an arrangement, it is possible to accurately and rapidly saw the slots 54 with a minimum of attention by the machine operator other than to load and unload the armature assembly into the armature slot-sawing machine.

The notch 51 also provides the additional function of facilitating the flow of solder into the slot 54 for the purpose of soldering the armature wire or wires therein. After the slots have been sawed and the armature wires 55 soldered in place, the entire commutator may be placed in a suitable machine tool and the slots 51, which in effect is a continuous peripheral groove in the completed commutator, may be machined out, together with the portions of the insulating member 10 which project thereacross.

The cross-sectional shape of the commutator segments shown in Figure 1 would come from using a cross-sectional shape of bar stock such as that shown in Figures 4, 5 and 6. The invention is not limited to this shape of bar stock. Thus, the invention contemplates segments which are so proportioned in plan view that they may be cut from alternate edges of elongated, generally flat bar stock. This requirement, generally stated, is that the segments as initially cut from the bar stock have noses and notches equally dimensioned and shaped such that the formation of a nose for one segment forms the notch in the adjacent segment which is to be cut from the opposite side of the bar stock and the length of the inner portions measured from the base of one notch to the end of the opposite nose be equal to one half the length of the outer portion of the segment. Thus, in accordance with the invention, the segments could be cut from bar stock having generally flat and parallel sides, which segments are subsequently swaged or otherwise formed to the desired wedge cross-sectional shape such that a solid, commutator construction will result. Obviously, such swaging would change the ultimate shape of the notches and noses but as the function of the notches and noses after they are once formed is simply to provide a groove into which the nose of the retaining ring is to fit, this will not be detrimental.

Figure 7 is illustrative of the necessary requirements of the necessary relationships of the noses and notches and the relative length of the inner portion to the outer portion. In Figure 7 there is shown a bar stock which may have either a cross-sectional shape similar to that shown in Figure 5 or a generally flat and rectangular cross-sectional shape such as the segments, after being cut, must be subsequently formed. In this embodiment of the invention, the noses 21' and the corresponding notches 16' are generally rectangular in shape, that is to say, their defining surfaces are parallel to the length of the bar stock rather than angularly disposed as is shown in Figure 5. Also, the relationship of the length 1 to the length $n$ is maintained the same as in Figure 5.

Figures 8 and 9 show a still further alternative embodiment of the invention. Here, as is shown in Figure 9, the segment as cut from the bar stock has the same shape as that shown in Figure 3. However, the cross-sectional shape of the bar stock is essentially that as shown in Figure 8; namely, the center web section 37', instead of having a thickness over its entire width to be included within the extended planes 38', is itself thicker generally at its mid section so as to extend to or beyond the extended planes 38'. Thus, the segments shown in Figure 9 as originally cut from the bar stock shown in Figure 8 will not be useable as such if the inner portion 14' extends beyond the planes 38' but will require a further forming operation, namely, that of reducing the cross-sectional thickness of the inner portion 15' such that the ultimate maximum thickness will be included within the extended planes 38'. Obviously, such a forming operation will change the plan shape of the inner portion generally to the shape shown by the right-hand side of Figure 9. If the mid section extends only to the extended planes as shown in Figure 10, no further forming operation will be necessary.

With segments formed from the shape of the bar stock C" as shown in Figure 10, a somewhat improved commutator construction will result in that when the segments are assembled into the final commutator, instead of having only the innermost corner of the segments bearing against each other and the insulation 10 such as is shown in Figure 2, there will be a substantial bearing area between adjacent commutators and the intermediate insulating segment 10 such that a more rugged commutator construction will result. In some respects, the improved ruggedness of the commutator will make up for the increased expense of manufacturing the more intricate cross-sectional shape of bar stock.

In Figures 5 and 7, the relationship of the length of the dimension 1 to the dimension $n$ has been shown as one to two. With such a ratio, it is possible to continuously cut commutator segments from a long copper bar stock without the production of any scrap, except at the ends of the bar stock, which scrap there produced can be held to a minimum by carefully controlling the length of the purchased bar stock to the dimension of the commutator segments. It will be appreciated, however, that design requirements of the commutator may require that the proportion of 1 to $n$ be varied from that stated which, while producing some scrap from between each segment as it is formed from the bar stock, still comes within the scope of the present invention.

The present invention has proven extremely practicable in actual service, enabling commutators for high-capacity generators or motors to be economically and rapidly manufactured, with a minimum or no scrap from the bar stock and with a minimum of labor employed in the manufacture. Less expensive generators result, thereby increasing the market therefor.

It will be appreciated that only a preferred embodiment of the invention has been described in this specification in detail and, obviously, modifications and alterations will occur to others upon a reading and understanding of this specification. It is my intention to include all such modifications and alterations insofar as they come within the scope of the appended claims.

Having thus described my invention, I claim:

1. The method of manufacturing a commutator comprising the steps of providing a plurality of commutator segments each with a transverse notch in a radially outer surface thereof, assembling said segments into a commutator ring with a layer of insulation between each segment and with the layer of insulation extending transversely across said notch, providing a slot sawing machine having a tool to saw longitudinal slots in each commutator segment, sawing each segment to provide a longitudinal slot, indexing said assembled commutator ring using said insulating material extending across said transverse notches as an index point for said slot-sawing machine, and repeating said sawing and indexing operation until all of said segments are slotted.

2. The method of manufacturing commutator segments from a long length of bar stock without the formation of any scrap comprising the steps of providing a bar stock comprised of generally three longitudinally-extending sections, including a pair of spaced sections with the sides thereof converging each toward the other section and an intermediate section having a thickness at the line of junction with the spaced section such as to be contained entirely within the extended planes of the sides of said spaced sections and a thickness intermediate the edges greater than the thickness of said extended planes, cutting commutator segments alternately from each side of said bar stock with each segment including substantially the entire width of an edge section and said intermediate section, the portion formed from said intermediate section having notches in each end thereof forming a nose on the side thereof remote from the portion formed from the spaced sections and with the nose and notch identically shaped and proportioned and subsequently forming the portion formed from said intermediate section to have a thickness to be entirely enclosed within the extended planes of the sides of the portions formed from the outer sections.

References Cited in the file of this patent
UNITED STATES PATENTS

| | | |
|---|---|---|
| 1,314,051 | Doman | Aug. 26, 1919 |
| 1,349,854 | Priest | Aug. 17, 1920 |
| 1,472,023 | Koos | Oct. 23, 1923 |
| 1,576,304 | Bryers | Mar. 9, 1926 |
| 1,819,142 | Wily | Aug. 18, 1931 |
| 1,898,696 | Sorensen | Feb. 21, 1933 |
| 2,600,312 | Meier | June 10, 1952 |
| 2,606,221 | Heintz | Aug. 5, 1952 |